United States Patent [19]

Bennett

[11] 3,788,238

[45] Jan. 29, 1974

[54] CAR SHIPPING APPARATUS
[75] Inventor: James R. Bennett, New Boston, Mich.
[73] Assignee: Evans Products Company, Plymouth, Mich.
[22] Filed: Apr. 11, 1972
[21] Appl. No.: 242,924

[52] U.S. Cl............................ 105/368 R, 105/368 T
[51] Int. Cl........................ B60p 7/08, B61d 45/00
[58] Field of Search........ 105/368 R, 368 T, 369 A; 280/179 A; 248/119 R, 361 A

[56] References Cited
UNITED STATES PATENTS

| 3,661,098 | 5/1972 | Jaekle et al. | 105/368 R |
| 3,605,636 | 9/1971 | Blunden et al. | 105/368 T |
| 1,780,277 | 11/1930 | Seeley et al. | 105/368 T |
| 1,753,838 | 4/1930 | Seeley | 105/368 T |
| 2,154,309 | 4/1939 | Hoose | 105/368 R |
| 2,227,870 | 1/1941 | Thomas | 105/368 R |
| 2,960,043 | 11/1960 | Clejan | 105/368 T |
| 3,659,533 | 5/1972 | Venditty | 105/368 R |

Primary Examiner—Drayton E. Hoffman
Attorney, Agent, or Firm—J. King Harness et al.

[57] ABSTRACT

An apparatus for shipping automobiles or other motor vehicles in a larger transporting vehicle. The transporting vehicle has doors that are supported for pivotal movement about a horizontally disposed axis positioned at a lower corner of the vehicle. The doors are pivotable from an opened position in which the transported vehicles may be placed side-by-side on the doors to a closed positions in which the transported vehicles are disposed generally on their sides, one above the other. An improved arrangement is provided for tying down the cars or transported vehicles on the door so as to prevent damage when the door pivots to its closed position. This tie down arrangement simultaneously locks on to the vehicle frame or under carriage and draws the vehicle downwardly to compress its suspension system during transit. The locking members of the tie down arrangement are positioned for access through openings in the door. In one embodiment of the invention, closures automatically cover these openings when the door moves to its closed position.

8 Claims, 8 Drawing Figures

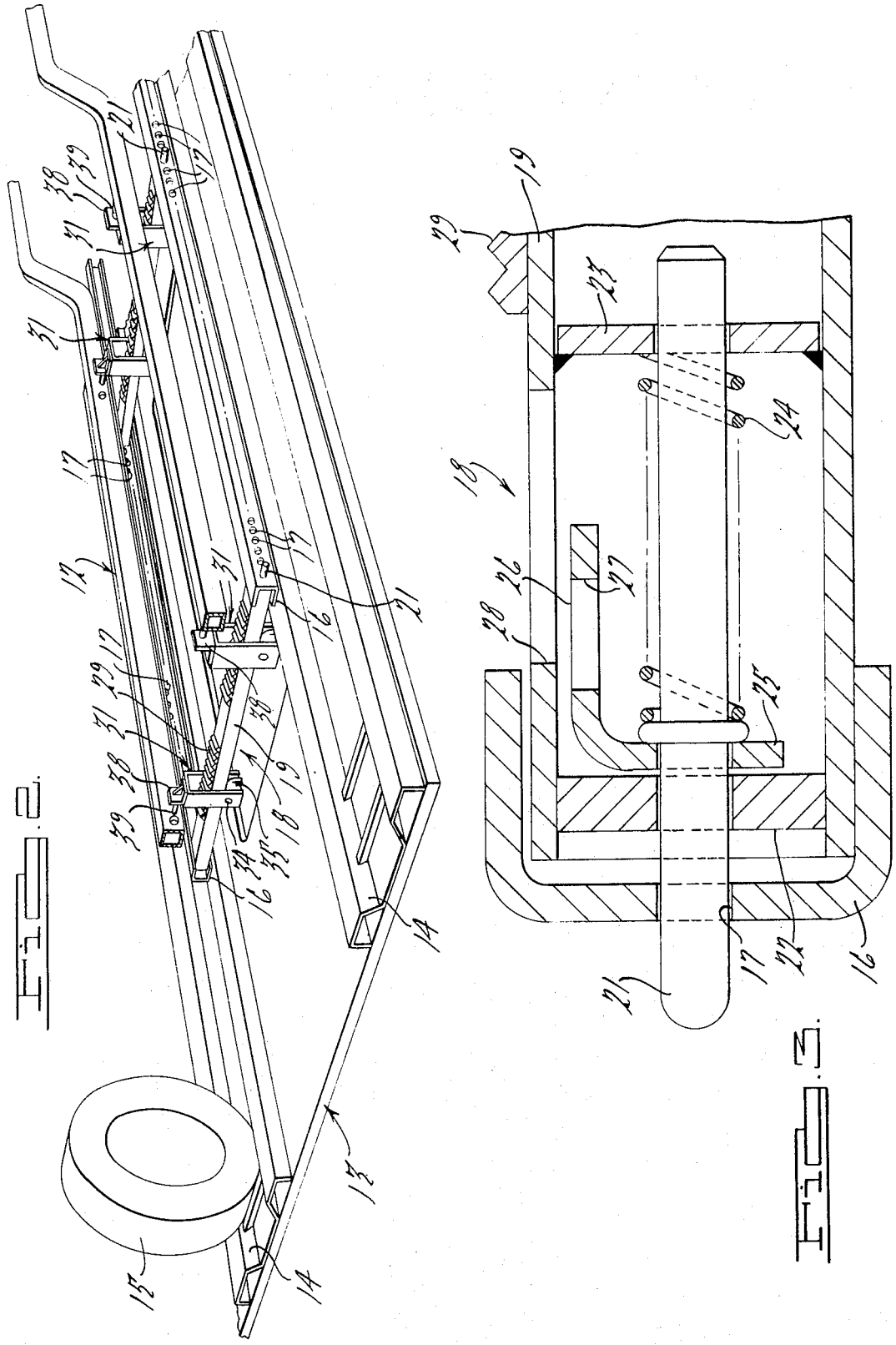

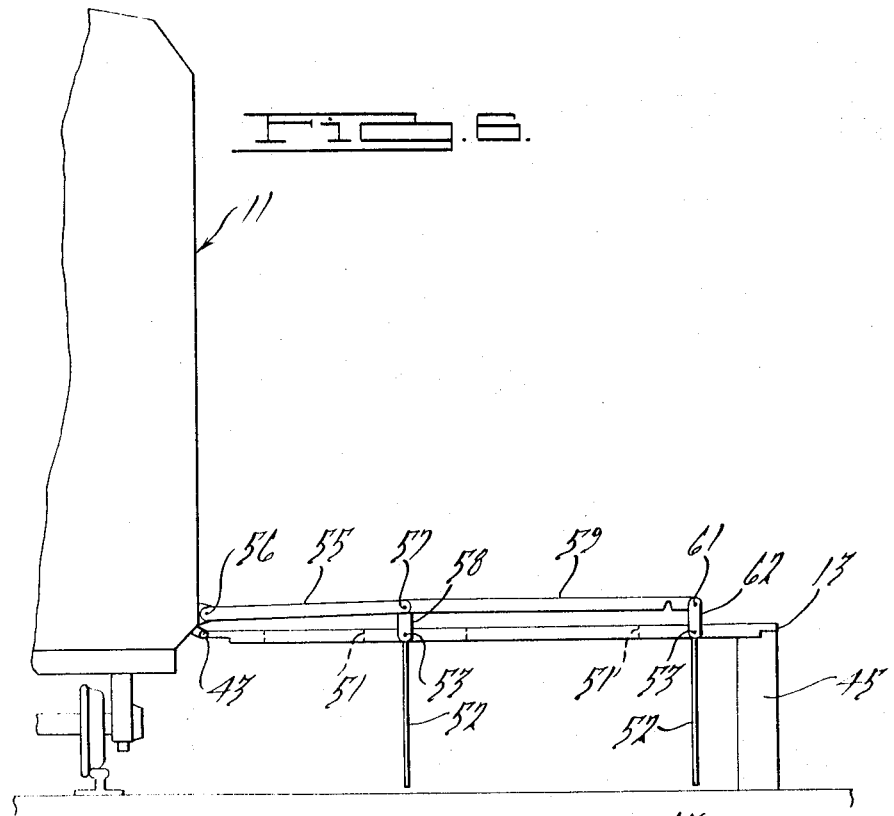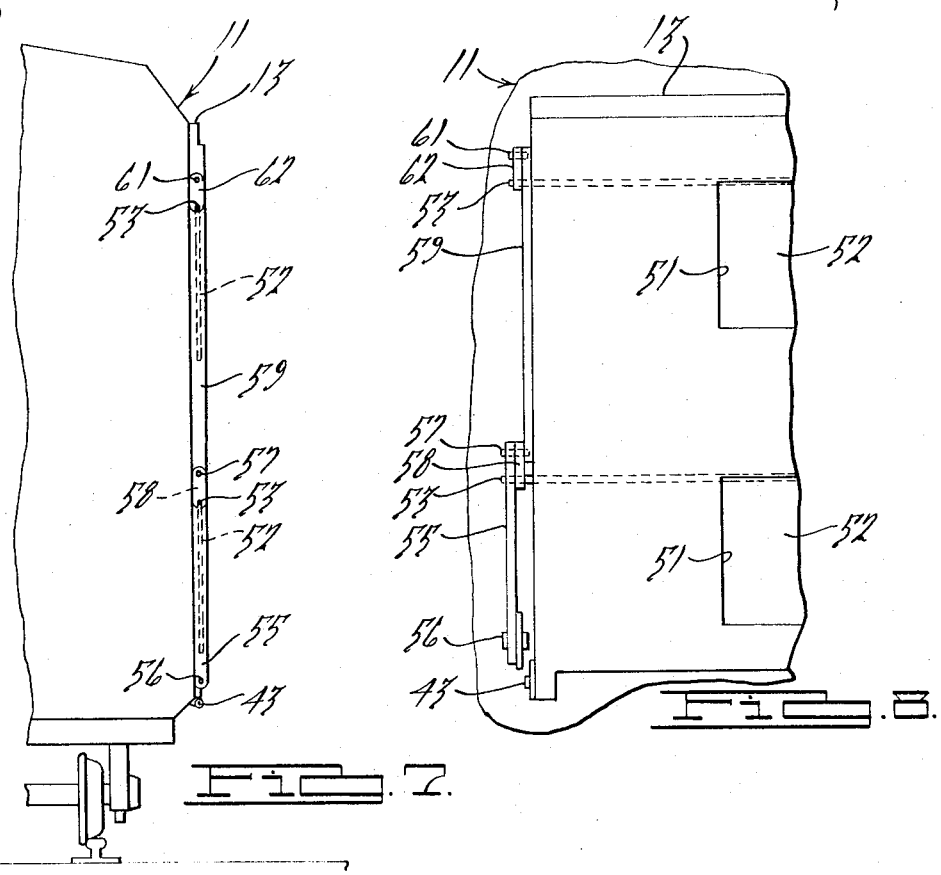

3,788,238

CAR SHIPPING APPARATUS

BACKGROUND OF THE INVENTION

This invention relates to a device for shipping automobiles or like vehicles in a large transporting vehicle and an improved tie down for tying down vehicles during shipment.

A large percentage of the automotive vehicles manufactured are shipped from assembly plants to distribution points by railway. Conventionally this has been done on a so called "tri-level" car. These cars have open rack like frames on which the automobiles are shipped in tiers of three. There are certain disadvantages to this type of shipment, the prime being that the transported automobiles are exposed and subject to vandalism and theft.

It has been proposed, therefore, to ship automobiles in closed railway cars. However, normal box car type shipping of automobiles seriously limits the number of automobiles that may be shipped in a given rail car. It has been proposed to construct a special automotive transporting railroad car having large doors on to which automobiles are placed. These doors pivot about a horizontally disposed axis so that the automobile is transported in a vertical orientation with one of its ends facing downwardly. This type of shipping method is shown in U.S. Pat. No. 3,613,914, entitled "Apparatus For Opening And Closing Doors Pivotally Attached To A Railway Car" issued in the name of William M. Jackle et al. on Oct. 19, 1971. A disadvantage with this type of shipping method is that it will only handle relatively small automobiles. Full size automobiles require a greater railroad car height than present right of way conditions can accommodate.

It is, therefore, a principal object of this invention to provide an improved device for shipping automobiles within a specially constructed transporting vehicle.

It is a further object of this invention to provide an improved device for transporting automobiles on a railroad car in which the automobiles are positioned in side-by-side relationship on a door of the vehicle that is pivotal about a horizontally disposed axis.

In most methods of transporting automobiles or other similar vehicles on a larger transporting vehicle it is essential to tie the transported vehicle down to the transporting vehicle during transit. The transported vehicle should be held in place on the transporting vehicle. Also, it has been found advantageous to hold the springs of the transported vehicle under compression by drawing down the suspended portion of the vehicle toward the transporting vehicle. Previously proposed tie downs have included a fitting that is fixed to a track on the transporting vehicle to determine the position of the transported vehicle thereupon. This fitting normally includes an integral winch for tensioning a flexible member that is attached to the vehicle frame and for drawing the vehicle down on its springs. This winch adds considerable cost to the tie down and make it a generally bulky arrangement.

It is, therefore, a further object of this invention to provide an improved tie down for the transportation of motor vehicles.

It is another object of the invention to provide an improved automotive tie down that does not incorporate a special winch but which nevertheless compresses the vehicular springs during transportation.

SUMMARY OF THE INVENTION

A first feature of the invention is adapted to be embodied in a device for shipping automobiles on a transporting vehicle. A device includes a load carrying door that is adapted to form a closure for a portion of the transporting vehicle. The door is pivotally connected to the transporting vehicle for movement about a horizontally disposed axis between an opened, loading position and a closed position. Means are provided on the door for receiving at least one automobile facing in a direction parallel to the pivot axis. Tie down means tie the automobile to the door for movement with the door from a substantially normal position to a generally on its side position as the door is moved from its loading position to its closed position.

Another feature of this invention is adapted to be embodied in a tie down for tying down vehicles or the like for shipment. The tie down includes a vehicle engaging member that is adapted to be affixed relative to a sprung portion of the transported vehicle. A locking member is provided, which locking member is movable from a released position to a locking position for affixing the tie down in a preselected position. Means simultaneously move the locking member to its locked position and move the vehicle engaging member in a direction to load the springs that carry the sprung portion of the vehicle engaged by the vehicle engaging member.

Still a further feature of this invention is adapted to be embodied in a tie down assembly for tying down vehicles for shipment relative to a pair of longitudinally extending transversely spaced tracks. The tie down assembly includes a cross piece adapted to extend between the tracks. Locking means are carried by the cross piece for locking the cross piece in preselected longitudinal positions relative to the track. A tie down is provided that has means for detachably affixing the tie down to the transported vehicle and locking means for locking the tie down to the cross piece in preselected transverse positions.

BRIEF DESCRIPTION OF THE DRAWINGS

FIG. 2 is an enlarged perspective view of one of the doors of the car shown in FIG. 1.

FIG. 3 is a further enlarged longitudinal cross sectional view showing a portion of the tie down mechanism.

FIG. 6 is an end elevational view, in part similar to FIG. 1, showing another embodiment of the invention.

FIG. 7 is a view, in part similar to FIG. 6, showing the load carrying door and associated components in its closed position.

FIG. 8 is a side elevational view of the mechanism shown in FIG. 7.

DETAILED DESCRIPTION OF THE PREFERRED EMBODIMENTS

Figure 1:
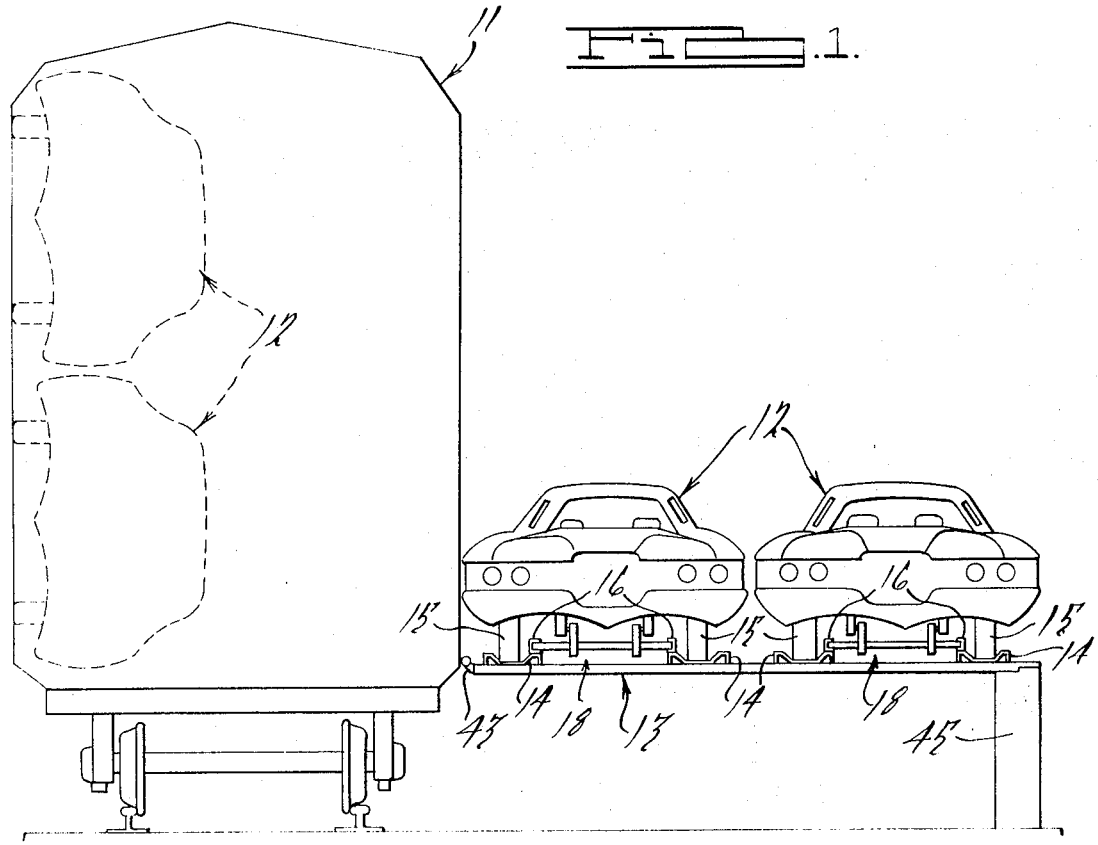
FIG. 1 is an end elevational view of a railroad car embodying this invention for adapting the car to the transportation of automotive vehicles.

Referring first to the embodiment of FIGS. 1 through 5, a specially constructed railroad car embodying this invention is identified generally by the reference numeral 11. The car 11 is particularly adapted to carry a plurality of automobiles or other motor vehicles, indicated by the reference numerals 12, from assembly to distribution points. The car 11 has a pair of specially constructed doors 13 that are pivotal about a horizontally disposed position from an opened position, as shown on the right-hand side of FIG. 1, to a closed position, as shown on the left-hand side of this Figure. In the opened position, the automobiles 12 may be driven or otherwise loaded on to the door 13. When the door 13 pivots to its closed position the automobiles 12 are transported on their side in a vertically stacked relationship.

The construction of the door 13 may best be understood by reference to FIG. 2, wherein a portion of one of these doors is shown in perspective. The door 13 is a structural member and includes pairs of tracks 14 that form guide ways for the wheels 15 of the vehicle 12. The guide ways or tracks 14 extend longitudinally of the door and parallel to its pivot axis. Any number of pairs of tracks 14 may be formed on the door 13 in side-by-side relationship. In the illustrated embodiment, two such pairs of tracks are provided. The doors 13 may also have any desired length. They may extend the full length of the rail car 11 or may be only of sufficient length to accommodate one row of automobiles.

A locking track in the form of an inwardly facing channel 16 is juxtaposed to each track 14. The locking tracks 16 are formed with a plurality of longitudinally spaced openings 17. A tie down mechanism, indicated generally by the reference numeral 18 cooperates with the tracks 16 for locking the automobiles 12 in place. One tie down mechanism 18 is positioned contiguous to each end of each automobile 12. These tie down mechanisms will be described by particular reference to FIGS. 2 through 5.

The tie down mechanism 18 includes a cross bar 19 of hollow tubular form. The ends of the cross bar 19 are positioned within the ends of the channel shaped locking track 16 so that the cross bar 19 may be slid to any desired longitudinal position relative to the door 13. Locking pins 21 are supported for reciprocation within the cross member 19 by a pair of apertured plates 22 and 23. A coil compression spring 24 encircles the pin 21 and acts against the plate 23 and a plate 25 that is fixed to the locking pin 21 for urging the locking pin to an extended position. In this position, the pin 21 is adapted to extend through selected apertures 17 of the locking track 16 for locking the cross bar 19 in the preselected longitudinal position.

The plate 25 has a rearwardly bent portion 26 in which an aperture 27 is formed. The aperture 27 underlies an elongated slot 28 formed in the upper surface of the cross bar 19. A suitable tool may be inserted through the slot 28 and into the aperture 27 for withdrawing the locking pin 21 against the action of the spring 24. When the locking pins 21 at each end of the cross bar 19 are released the cross bar 19 may be slid to any desired longitudinal position.

The upper end of the cross bar 19 carries a serrated rack 29. Tie down fittings 31 cooperate with the teeth of the rack 29 for affixing the underframe of the vehicle 12 in preselected longitudinal positions relative to the door 13 and for compressing the springs of the vehicle 12.

Figures 4, 5:
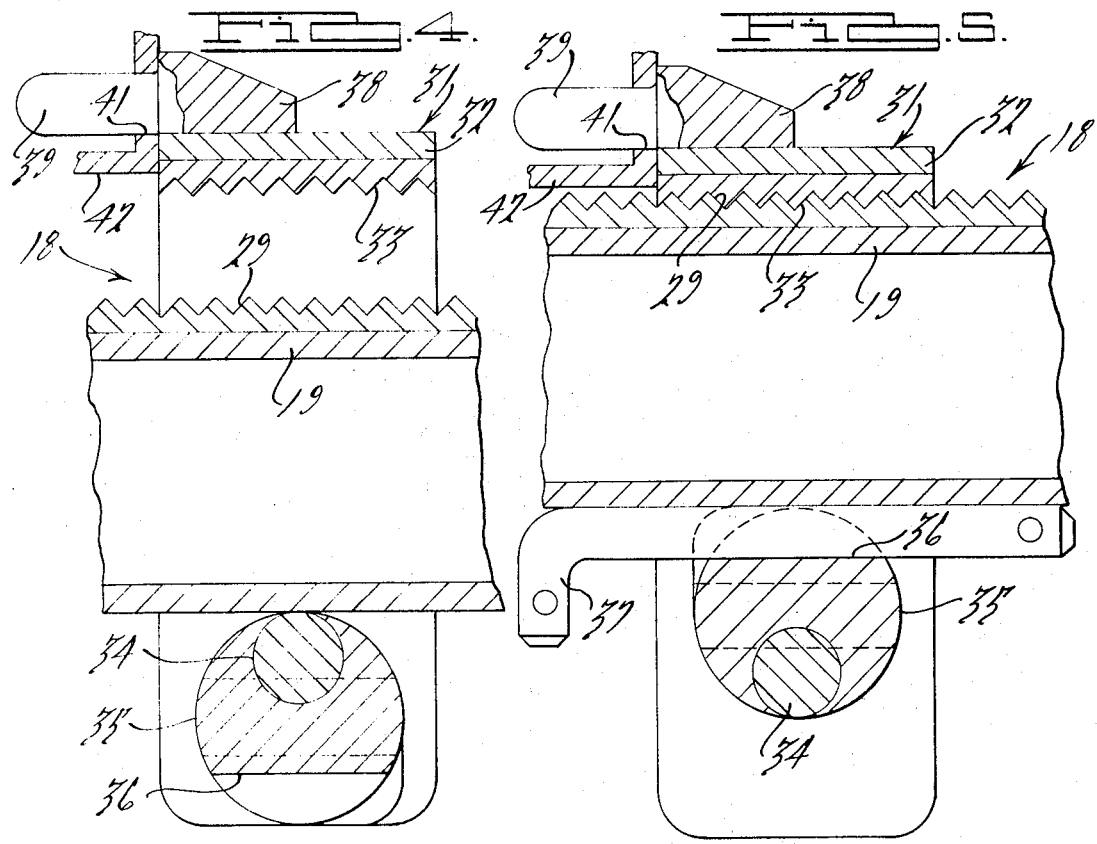
FIG. 4 is an enlarged cross sectional view showing another portion of the tie down mechanism in its released position.
FIG. 5 is a cross sectional view, in part similar to FIG. 4 showing the tie down portion in its locked position.

The tie down fittings 31 are best shown in FIGS. 4 and 5 and include generally U-shaped pieces 32 that have depending legs which are positioned at opposite sides of the cross member 19. A rack 33 is affixed to the cross leg of the piece 32 and faces in a downward direction toward the serrated rack 29 of the cross member 19. A shaft 34 is journalled in aligned apertures formed in the extending legs of the member 32 and below the lower surface of the cross member 19. An eccentric 35 is fixed to the shaft 34 between the legs of the member 32 and is rotatable between a released position (FIG. 4) and a locked position (FIG. 5). A notch 36 is formed in the eccentric 35 for the insertion of a locking pin 37 to retain the eccentric 35 in its locked position.

Affixed to the upper side of the member 32 is a vehicle engaging portion 38 that has an outwardly extending pin part 39. The pin part 39 is adapted to extend into an aperture 41 formed in the frame 42 of the vehicle 12. The term "frame" is used herein to define either the frame of a frame type vehicle or any suitable structural member of a so called frameless or unitized vehicle. In either event, the member 42 should form a portion of the sprung mass of the vehicle.

OPERATION

Each of the doors 13 is connected to the rail car structure 11 in a suitable manner by means including a hinge arrangement 43 (FIG. 1). The hinge structure 43 supports the door 13 for its pivotal movement about a horizontally disposed axis that extends longitudinally of the car 11 contiguous to its lower corner. The cross members 19 are appropriately locked in place on the locking track 16 so as to accommodate the size of automobiles 12 to be shipped. At this time, the fittings 31 will be loose on the cross member 19. In this position, the teeth of the racks 33 and 39 will be in engagement as shown in FIG. 5, but the cam 35 will be rotated to its released position as shown in FIG. 4. The vehicles 12 are then driven or otherwise placed on the open door 13. The outer edge of the door 13 preferably is supported in any suitable manner, as by a stanchion 45. When the automobiles 12 are in place on the door 13 an operator passes beneath the door 13 and registers the locking pins 39 with the frame apertures 41 as shown in FIG. 4. When this is down, the vehicles 12 stand at their normal unladen height. The cams 35 are then rotated by means of any suitable type of tool from the position shown in FIG. 4 to the position shown in FIG. 5. As the eccentric cam 35 engages the underside of the cross member 19 the vehicle engaging member 38 and remainder of the tie down fitting 31 is then drawn vertically downwardly. Because of its engagement with the sprung portion of the vehicle, the vehicle will also be drawn downwardly compressing its springs. This rotation is continued until the tie down fitting teeth 33 engage the cross member teeth 29. Thus, the vehicle 12 is not only tied down but simultaneously the tie down fittings 31 are locked in lateral position relative to the cross member 19. It should be noted that the length of the rack 29 is sufficient so as to accommodate vehicles of widely varying widths.

Once tied down, the door 13 may be pivoted about the axis defined by the hinges 43 to its closed position as shown in the left-hand side of FIG. 1. The vehicles 12 are held in place by the tie down mechanism and will not become damaged during shipment.

It should be noted that access openings are formed in the doors so as to permit locking and tying down of the fittings 31. To prevent accidental or unauthorized release of these fittings it is desirable to provide a closure for these door openings. A structure providing such a closure which is automatic in operation is shown in the embodiment of FIGS. 6 through 8.

In this embodiment, the door 13 has openings 51 that are positioned between each of the tracks 14. Juxtaposed to the openings 51 is a respective closure plate 52 that is supported for pivotal movement relative to the door 13 by a pivot pin 53. An operating link 55 is pivotally connected at one of its ends of the rail car 11 by means of a pivot pin 56. The pivot pin 56 is disposed immediately above the pivot axis of the door 13.

The outer end of the actuating link 55 is connected by means of a pivot pin 57 to a shorter link 58. The other end of the link 58 is affixed to the closure member 52 immediately adjacent the rail car 11. A parallel link 59 is connected between the pivot pin 57 and a pivot pin 61 carried at the upper end of a second short link 62. The short link 62 is connected to the outermost closure member 52.

FIG. 6 illustrates the mechanism when the door 13 is in its opened position. As the door 13 is pivoted to its closed position, the link 55 will exert a pressure through the pivot pin 57 on the link 58. A similar pressure will be exerted on the link 62 by the link 59. These pressures causes the closure members 52 to pivot in a clockwise direction about their pivot pins 53 as the door 13 is swung closed. When the door 13 is fully closed (FIG. 7) the closure members 52 will completely cover the apertures 51. It should be readily apparent that the closure members 52 cannot be opened in this condition without opening of the door 13. When the door 13 is opened, the closure members 52 will automatically open.

It is to be understood that the foregoing description is that of preferred embodiments of the invention. Various changes and modifications may be made without departing from the spirit and scope of the invention as defined by the appended claims.

I claim:

1. A device for shipping automobiles in a transporting vehicle comprising a load carrying door adapted to form a closure for a portion of the transporting vehicle, means for pivotally connecting said door to the transporting vehicle for movement about a horizontally disposed axis from an opened, leading position to a closed position, means on said door for receiving at least one automobile facing in a direction parallel to said pivot axis, means for tying the automobile to said door for movement therewith from a substantially normal position to a generally on its side position as said door is moved from its loading to its closed position, said means for tying the automobile to the door including a cross bar movable to preselected longitudinal positions relative to the door and a tie down fitting engageable with the automobile and selectively lockable to said cross bar, an access opening in the door through which said tie down fitting may be located to said cross member, a closure member pivotally supported upon the door adjacent said access opening, and means for automatically moving said closure member from an opened position to a closed position across said access opening when said door moves from its opened position to its closed position.

2. A device as set forth in claim 1 wherein there are means on the door for receiving at least a second automobile facing in a direction parallel to the direction the first automobile faces so that the automobiles are stacked vertically one above the other when the door is in its closed position and means for tying the second automobile to the door.

3. A device as set forth in claim 1 wherein the means for tying the automobile to the door comprises a pair of longitudinally extending locking tracks fixed relative to the door, a cross bar adapted to span said locking tracks, means carried at the opposite ends of said cross bar for locking said cross bar to said locking tracks in preselected longitudinal positions, a pair of tie down fittings adapted to be affixed relative to the frame of the associated vehicle, and means for selectively locking said tie down fittings to said cross bar at preselected transverse locations.

4. A tie down for tying down vehicles or the like for shipment, said tie down including a vehicle engaging member adapted to be fixed relative to a sprung portion of the transported vehicle, a locking member affixed to said vehicle engaging member and movable from a released position to a locking position, means cooperating with said locking member when in its locked position for affixing said tie down against movement and in a preselected position, and and eccentric cam supported for rotation about an axis that extends perpendicularly to the direction of movement of said locking member and cooperating therewith for simultaneously moving said locking member to its locked position and for moving said vehicle engaging member in a direction to load the springs supporting the sprung portion of the vehicle engaged by said vehicle engaging member rotation of said eccentric cam about said axis.

5. A tie down as set forth in claim 4 wherein the locking member and the cooperating means comprise serrated racks.

6. A tie down as set forth in claim 4 adapted to be used in conjunction with a pair of transversely spaced tracks, the cooperating means comprising a cross bar adapted to extend between the tracks and locking means carried by said cross bar for locking said cross bar in preselected longitudinal positions relative to the tracks.

7. A tie down as set forth in claim 5 adapted to be used in conjunction with a pair of transversely spaced tracks, the cooperating means comprising a cross bar adapted to extend between the tracks and locking means carried by said cross bar for locking said cross bar in preselected longitudinal positions relative to the tracks.

8. A device for shipping automobiles in a transporting vehicle comprising a load carrying door adapted to form a closure for a portion of the transporting vehicle, means for pivotally connecting said door to the transporting vehicle for movement about a horizontally disposed axis from an opened, loading position to a closed position, means on said door for receiving at least one automobile facing in a direction parallel to said pivotal axis, a pair of longitudinally extending locking tracks fixed relative to said door, a cross bar adapted to span said locking tracks, means carried at the opposite ends of said cross bar for locking said cross bar to said longitudinal tracks in preselected longitudinal positions, a pair of tie down fittings adapted to be affixed relative to the frame of the associated vehicle, means for selectively locking said tie down fittings to said cross bar at preselected transverse locations, and locking cam members for simultaneously locking said tie down fittings to said cross member and for drawing the automobile toward said cross bar for compressing its springs and for tying the automobile to said door for movement therewith from a substantially normal position to a generally on its side position as said door is moved from its loading position to its closed position.

* * * * *